United States Patent [19]

Brayer et al.

[11] Patent Number: 5,000,239
[45] Date of Patent: Mar. 19, 1991

[54] ALL-SEASON HIGH-PERFORMANCE RADIAL-PLY PASSENGER PNEUMATIC TIRE

[76] Inventors: Randall R. Brayer, Uniontown; Beale A. Robinson, North Canton; Richard H. Springford, Stow, all of Ohio

[21] Appl. No.: 276,345

[22] Filed: Nov. 25, 1988

Related U.S. Application Data

[60] Division of Ser. No. 35,965, Apr. 8, 1987, Pat. No. 4,815,511, which is a continuation-in-part of Ser. No. 840,812, Mar. 18, 1986, Pat. No. 4,702,292.

[51] Int. Cl.[5] .......................... B60C 3/04; B60C 11/00
[52] U.S. Cl. ................................ 152/209 R; 152/454; 152/525
[58] Field of Search .......... 152/209 R, 209 A, 209 D, 152/454, 525, 510

[56] References Cited

U.S. PATENT DOCUMENTS

| | | | |
|---|---|---|---|
| 4,082,132 | 4/1978 | Arai et al. | 152/209 R |
| 4,407,346 | 10/1983 | Bandel et al. | 152/209 R |
| 4,408,648 | 10/1983 | Ohashi | 152/454 |
| 4,424,844 | 1/1984 | Fontaine | 152/209 R |

Primary Examiner—Michael W. Ball
Assistant Examiner—Geoffrey L. Knable

[57] ABSTRACT

A passenger car tire that combines a number of design features or parameters which yeild a tire which has road noise, tread wear and handling performance characteristics which are equal to or better than those exhibited by comparable prior art tires, which possesses improvements in mud and snow performance not heretofore approached in prior art high performance tires, and in which heat dissipation characteristics are such that ornamental white sidewall lettering may be applied without in any way detracting from performance and durability characteristics. Moreover, and most surprisingly, the tire of the present invention is actually lighter in weight than is the most comparable prior art high performance tire, which does not possess the improved mud and snow characteristics of the invention.

3 Claims, No Drawings

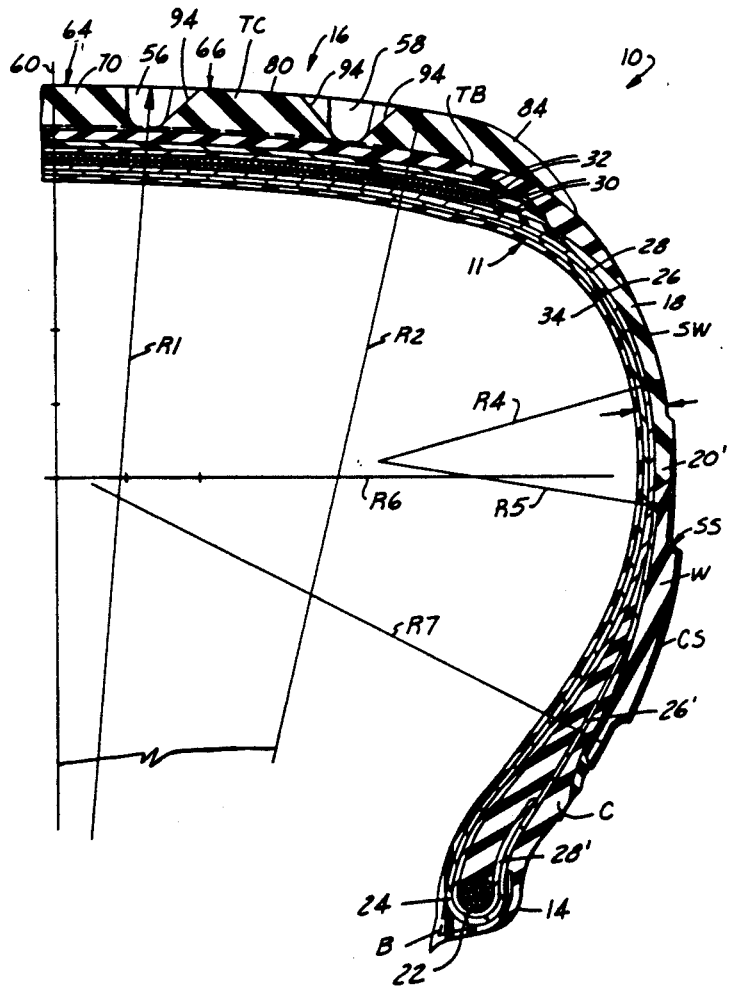

ALL-SEASON HIGH-PERFORMANCE RADIAL-PLY PASSENGER PNEUMATIC TIRE

This application is a division of co-pending application Ser. No. 035,965 filed Apr. 8, 1987, now U.S. Pat. No. 4,815,511, which was continuation-in-part of application Ser. No. 840,812 filed Mar. 18, 1986, now U.S. Pat. No. 4,702,292.

The present invention relates to an all-season high-performance radial-ply pneumatic tire for passenger and light truck vehicles.

BACKGROUND OF THE INVENTION

An all-season pneumatic tire is regarded as one which currently qualifies for a mud and snow (M&S) service rating under the criteria for such rating established by the Rubber Manufacturing Association, Akron, Ohio. In general, such rating requires that the tire tread have grooves of depth at the lateral edges that are substantially equal to the average groove depth in the vicinity of the mid-circumferential plane, are angled laterally toward the respective lateral (axial) edges of the tread for at least one-half inch, and such grooves are required to have a width of at least 0.060 inch at the tread surface. All-season tires are characterized by grooves that define blocks, and sometimes one or more ribs, in the tread surface. This results in a more aggressive appearance than that of a more conventional fully-ribbed tire, and provides improved traction characteristics in snow and under wet conditions as compared to the conventional ribbed tire. All-season tires are distinguished from snow tires in that, while both are required to satisfy all Federal Motor Vehicle Safety Standard 109 tests applicable to passenger tires in general, snow tires are exempt from the tire grade labelling standards.

On the other hand, high-performance tires are not subject to an industry standard definition. High-performance tires are generally understood to be characterized as having an aspect ratio (hereinafter defined) that is equal to or less than 70 percent. High-performance tires also have high traction on dry and wet pavement, stiff cornering characteristics, and in some cases have H or V speed ratings, such ratings being based on a system originally established in Europe. A high-performance passenger pneumatic tire typically possesses an aggressive and ornamental tread design that, as is the case with many all-season tires, typically is of a block-type pattern. In the high-performance tire, stiffness at the tread shoulder is desirable for its cornering characteristics, but can present problems with heat buildup, particularly in speed-rated tires. In contrast to all-season tires, the typical high-performance tire, for reasons of both rubber compounding and mechanical design, does not yield desired performance in cold weather and does not possess desirable mud and snow traction characteristics.

The modern radial-ply pneumatic tire is designed under standards promulgated by any of several organizations, including The Tire & Rim Association, Inc., The European Tyre & Rim Technical Organisation and the Japan Automobile Tire Manufacturers Association. Under the standards of these organizations, which are quite similar, when a tire of a given size is being designed, it is designed for mounting on a "design rim," which is a rim having a specified configuration and width. The "design rim width" is the specific rim width assigned to each tire size and typically is equal to 70 percent of the specific tire's "section width." The "section width" is the width of the new tire, including 24-hour inflation growth and including normal sidewalls, but not including protective side ribs, bars or decorations. The "section height" of the tire is equal to the radial distance from the nominal rim diameter to the outer diameter of the tire at its mid-circumferential plane. The "aspect ratio" of the tire is the ratio of its section height to its section width. The "tire design load" is the base or reference load assigned to a tire at a specific inflation pressure and service condition; other load-pressure relationships applicable to the tire are based on that base or reference load. The terms "normal inflation pressure" and "normal load" as used herein refer respectively to the specific inflation pressure and load assigned by the appropriate standards organization for the design load as defined above for the service condition of the tire.

SUMMARY OF THE INVENTION

The present invention has substantially improved the radial-ply pneumatic tire by providing a pneumatic tire suitable for both passenger and light truck vehicles having high-performance characteristics while also providing all-season characteristics which, in the past, have not been available. Thus, the invention provides the improved snow and wet traction performance characteristics of an all-season tire while providing the high-performance handling characteristics desirable in speed-rated and other high-performance tires. The invention is further characterized in that the advantages are obtained with a tire construction that is substantially lighter in weight than the closest prior art tire of which the inventors are aware, while being less expensive to manufacture. The invention thus provides an all-season high-performance radialply pneumatic tire for passenger and light truck vehicles.

The tire comprises a pair of axially spaced annular beads, annular tensile members within the beads, and a pair of plies having cords extending radially of the tire between the annular tensile members. A reinforcing belt structure circumferentially surrounds and reinforces the carcass, and means in the form of a liner is positioned on the inner side of the carcass for retaining pressurized air within the tire when it is mounted on a rim and inflated. A tire tread is positioned radially outwardly of the belt structure and has a ground-engageable surface with two axially opposite lateral edges. The lateral edges of the tread are defined by the lateral (axially directed) width of the tread surface that contacts the ground when the tire is mounted on its design rim and is at normal inflation pressure and normal load.

The all-season high-performance pneumatic tire of the invention has an aspect ratio less than or equal to 70 percent and also has a tire tread that has grooves of depth at its lateral edges equal to the full groove depth at the mid-circumferential plane of the tire. Such grooves, at the lateral edges, are angled in the axial direction for at least one-half inch at the tread surface and have a width at such surface of at least 0.060 inch. The grooves in the tread define blocks of elastomeric material, the individual blocks having an average dimension in the circumferential direction and an average dimension in the lateral direction. The ratio of the average circumferential dimension to the average lateral dimension for the blocks of elastomeric material in the tread is less than 1.0. Specifically, the tread blocks are positioned in at least three circumferential arrays around the tread, with the middle array being intersected by the mid-circumferential plane of the tire, and with the outer arrays being positioned on opposite axial sides of such plane. In the preferred embodiments of the invention containing three circumferential tread block arrays separated from each other by circumferential drainage grooves, the ratio of the average circumferential dimension of the tread blocks to the average axial dimension is greater for the tread blocks in the middle array which intersects the mid-circumferential plane than for the axially adjacent tread blocks in the outer arrays. In the preferred embodiments of the invention, the tread blocks are of substantially triangular contour viewed radially of the tire, each having one edge extending circumferentially of the tire along and collectively defining the adjacent circumferential groove. Circumferentially adjacent triangular tread blocks in each array have second and third edges which converge in opposite directions axially of the tire. Most preferably, the second and third edges of circumferentially adjacent blocks are of complementary arcuate contour. Rectangular tread blocks extend from the outer circumferential grooves into the tire shoulder. Tread void volume in the preferred embodiments of the invention is substantially equal to 40%.

The tire of the present invention also has a non-skid depth in the tread which is less than the full non-skid depth specified by The Tire & Rim Association Inc. for each tire size by an amount substantially equal to 11%. Furthermore, the elastomeric material in the respective sidewalls of the tire, as applied to the tire carcass after calendering, has a thickness in at least one portion of each sidewall less than or equal to the thickness of the carcass and liner at such portion. In the preferred tire constructions disclosed hereinafter, at least one of the radial tire plies has a turnup which extends from the bead-reinforcing tensile member into the adjacent sidewall portion of the tire. At least one overlay, and preferably a pair of overlays, circumferentially surround the tread-reinforcing belt structure in speed-rated tires in accordance with the invention.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
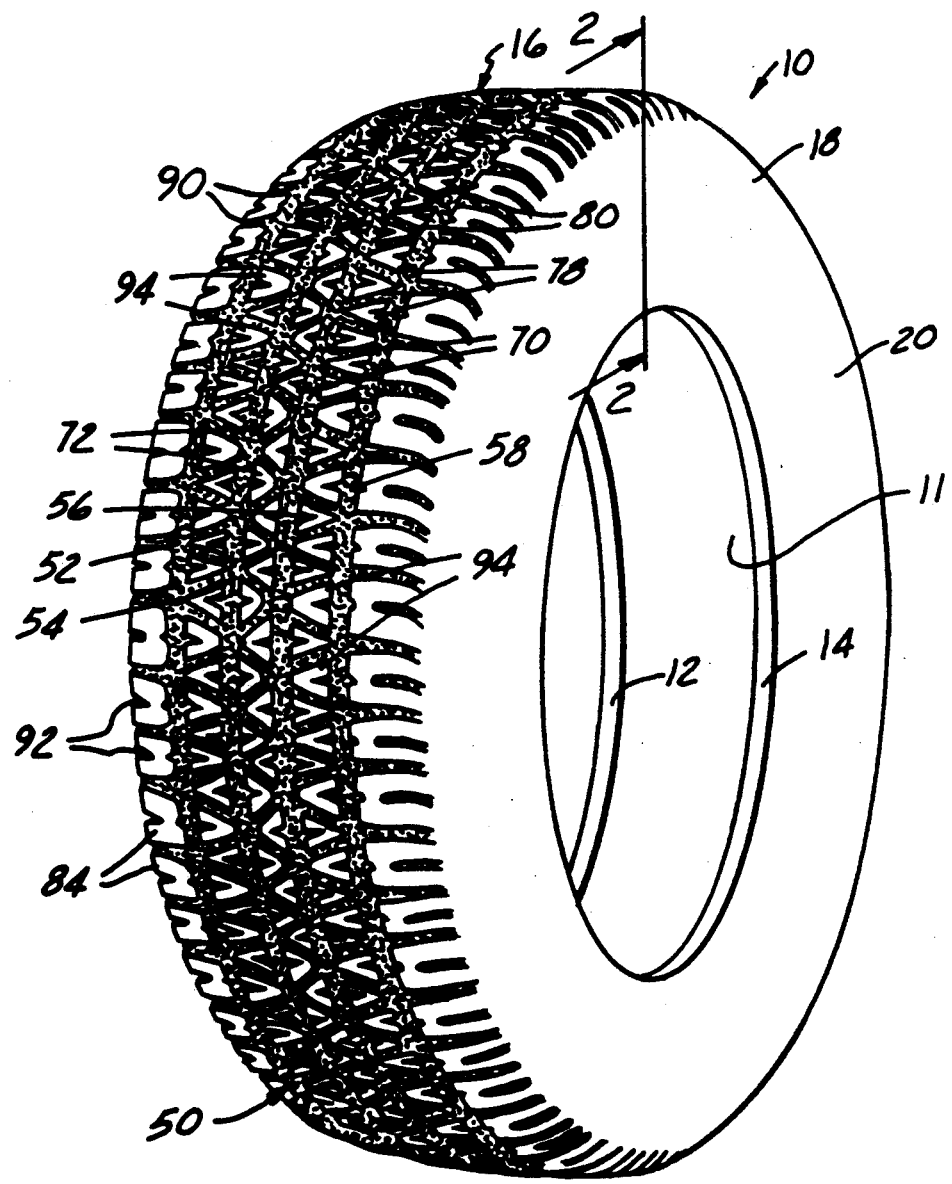
FIG. 1 is a perspective view of a tire in accordance with a presently preferred embodiment of the invention.

In the drawings and the following description, a presently preferred embodiment 10 (FIGS. 1, 2 and 4) of a tire in accordance with the invention is compared with what applicants consider to be the closest prior art in terms of handling and performance—namely, the tire 40 (FIGS. 3 and 5) marketed by applicants' assignee under the trade designation "EAGLE GT". In particular, a P205/70HR14 size tire 10 in accordance with the invention is compared with an identically sized Eagle GT tire 40 in accordance with the prior art. As is well known in the art, the "P" in the above size designation connotes a passenger car tire, "205" is the section width in mm, "70" is the tire aspect ratio (section height divided by section width), "H" is a standard speed rating designation, "R" connotes a radial ply tire, and "14" is rim bead seat design diameter in inches. Comparative characteristics of tires of other sizes are comparable to those herein discussed.

Tire 10 includes a carcass 11 having the usual tire beads 12, 14 of inside diameter and axial spacing as a function of tire size for placement on a correspondingly sized wheel rim. The tread area 16 of tire 10 is coupled to bead 14 by a tread shoulder 18 and a tire sidewall 20 (FIGS. 1 and 2), a complementary shoulder and sidewall coupling tread 16 to bead 12. Internally, tire bead 14 is reinforced by a circumferentially continuous annular tensile member in the form of a high-tensile wire bundle 22. A bead toeguard 24 is positioned between reinforcing wire bundle 22 and the toe of bead 14. Two plies 26, 28 of polyester cord extend through carcass 11 between and encircle reinforcing bundles 22 of each bead 12, 14 in the usual manner. A pair of steel belts 30 overlie plies 26, 28 within tread area 16, and a pair of nylon overlays 32 encircle belts 30 for reinforcement and to prevent tread separation. Most preferably, tire 10 includes a butyl liner 34. Outer ply 28 (with respect to the tire cavity) has a low turnup 28', while inner ply 26 has a high turnup 26' which extends into the sidewall area for enhanced reinforcement.

As is generally conventional, differing rubber compounds are employed in the tread cap TC, tread base TB, sidewall SW, chafer C and bead B. A sidewall strip SS includes white compound W covered by a gum cover strip CS which is later ground away to expose outline white letters or conventional white sidewall ornamentation. To the extent thus far described, the prior art tire illustrated in cross-section in FIG. 3 possesses generally similar construction elements, with corresponding elements being indicated by correspondingly identical reference numerals followed by the suffix "a". In the prior art tire of FIG. 3, the gum cover strip CSa is flush with the outer surface of sidewall 20a and is later removed to form recessed letters or ornamentation.

Figure 4:
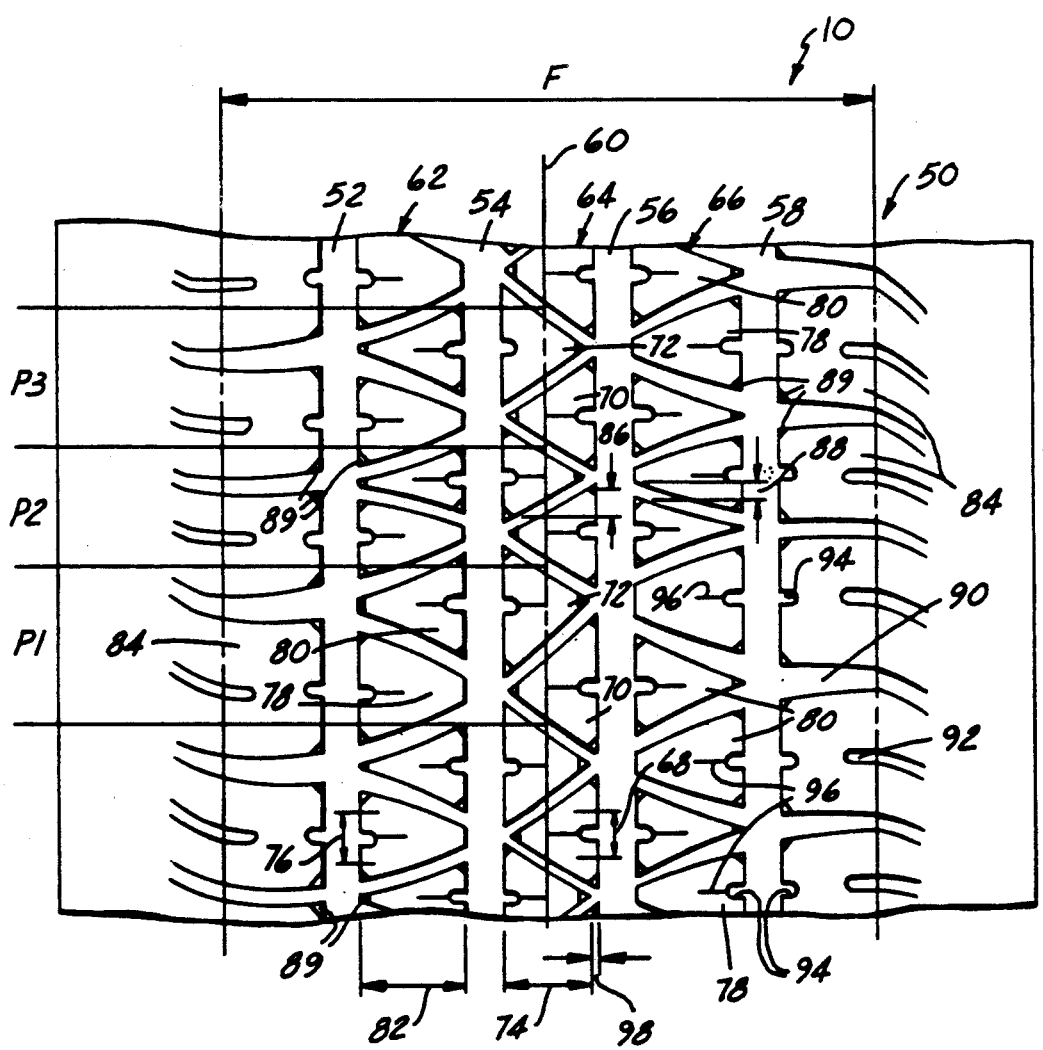
FIG. 4 is a fragmentary elevational view of the tire of FIG. 1 illustrating the tire tread pattern on an enlarged scale.

The tread pattern 50 of tire 10 is illustrated fragmentarily in FIG. 4 as comprising four substantially straight circumferentially continuous grooves 52, 54, 56, 58 positioned in opposed complimentary pairs on opposite sides of the tire mid-circumferential plane 60. Between each adjacent pair of circumferential grooves 52-54, 54-56 and 56-58, there is disposed a circumferential array 62, 64 and 66 of substantially triangular tread block elements separated from each other by the circumferential grooves and by series of grooves extending at an angle to the tire axis between the circumferential grooves. As best seen in FIG. 4, the triangular tread block elements of each series 62,64,66 are internested, which is to say that a base edge of each triangular tread block element is positioned along (and collectively define) an adjacent circumferential groove, and the side edges of alternating tread block elements of each series converge in successively opposite axial directions. Tread block series 64 between inner circumferential grooves 54,,56 intersects and is bisected by mid-circumferential plane 60. Series 62,66 between grooves 52–54 and 56–58 are thus disposed on opposite axial sides of plane 60. Grooves 54,56 are equidistant from plane 60, as are grooves 52,58.

In accordance with an important feature of tread pattern 50 of the present invention, the ratio of the circumferential dimension to the axial dimension of each triangular tread block element is less than 1. That is, the circumferential dimension 68 of each element 70,72 within center series 64 is less than the axial dimension 74 of that element. In the same way, the circumferential dimension 76 of each block element 78,80 of series 62 (and 66) is less than the corresponding axial dimension 82 of that element. Furthermore, and in accordance with yet another important aspect of the present invention, the ratio of the circumferential dimension to the axial dimension of each series 62,64,66 of triangular tread block elements decreases outwardly from the mid-circumferential plane 60 toward the tire shoulder. Rectangular tread blocks 84 are formed at the opposing tire shoulders. Provision of triangular tread block elements having a ratio of circumferential dimension to axial dimension less than unity yields circumferential flexibility in the tire tread while maintaining axial stiffness. This may be contrasted with the tread pattern 50a of the prior art tire illustrated in FIG. 5 wherein the ratio of the average circumferential dimension to axial dimension of the tread block elements is substantially equal to unity, thereby providing stiffness in both circumferential and axial directions. Furthermore, provision of a reduced ratio in the outer tread block series 62,66 as compared with the middle series 64 allows greater circumferential overlapping 86 of traction elements at the center plane as they enter the footprint for better handling, a region of higher intermediate stiffness with lesser overlap 88 on each side of the mid-circumferential plane, and then a region of high stiffness at the rectangular shoulder elements 84. It is believed that this feature contributes to the superior handling characteristics exhibited by the tire of the present invention during handling tests.

FIG. 4 illustrates three circumferentially adjacent pitches P1,P2 and P3 of tread block elements. Circumferential lengths of pitches P1,P2,P3 (and thus circumferential dimensions of the tread block elements within each pitch) as well as pitch sequence around the tire tread are preferably in accordance with the disclosure and claims of U. S. Pat. No. 4,327,792 assigned to the assignee hereof for reduction of road noise generated by the traction elements. It will be noted that the circumferential dimensions of the traction elements 70,72,78,80 and 84 vary between pitches, while the axial dimensions remain substantially constant. Thus, the circumferential-to-axial dimension ratio of the tread blocks within each series 62,64,66 varies from pitch to pitch. However, within any given pitch, the circumferential-to-axial dimension ratio of tread block elements 78,80 within outer series 62,66 is less than the corresponding ratio for tread block elements 70,72 in middle series 64.

In the specific tire illustrated in the drawings, the circumferential length of Pitch P2 is equal to 7/9 P3, while the length of Pitch P1 is equal to 11/9 P3, with Pitch P3 being equal to 1.424 inches. The tire tread contains 56 pitches in the following sequence:

23133322331132223333111332231133223311332223-33331111333.

Table I lists average circumferential-to-axial dimension ratio for tread block element series 60 and series 62,64 in each of fifteen differently-sized tires constructed in accordance with the dimension:

TABLE 1

| Tire Size | Block Series 64 | Block Series 62,66 | Ratio 62,66/64 |
|---|---|---|---|
| 185/70/13 & 14 | 0.77 | 0.60 | 0.78 |
| 195/60/14 | 0.63 | 0.49 | 0.78 |
| 195/70/13 & 14 | 0.75 | 0.60 | 0.80 |
| 205/60/14 | 0.60 | 0.49 | 0.82 |
| 205/70/14 | 0.67 | 0.54 | 0.81 |
| 215/60/14 & 15 | 0.58 | 0.45 | 0.78 |
| 215/65/15 | 0.64 | 0.50 | 0.78 |
| 225/60/14 | 0.58 | 0.44 | 0.76 |
| 225/60/15 | 0.49 | 0.41 | 0.84 |
| 225/70/15 | 0.64 | 0.51 | 0.80 |
| 235/60/14 | 0.54 | 0.43 | 0.80 |
| 245/60/15 | 0.51 | 0.40 | 0.78 |

Circumferential dimensions for purposes of Table I were measured midway between centerlines of the adjacent grooves. Average circumferential dimensions were obtained as mathematical averages for three pitches P1,P2,P3. It will be noted that all ratios are less than unity, and that average ratio within outer series 62,66 is always less than for middle series 64. Note that, although the dimension ratios themselves vary substantially with tire size, the ratio of the ratios remains substantially constant between 0.78 and 0.84.

In accordance with another feature of tread pattern 50 best seen in FIG. 4, the tread grooves which separate circumferentially adjacent tread blocks extend continuously across the tire tread between outer circumferential grooves 52,58. Such continuity eliminates "dead spots" within the tire tread which would otherwise retard water channeling. Furthermore, such grooves are angulated with respect to the tire axis so that the triangular tread block elements are circumferentially staggered and do not come into ground engaging contact simultaneously. This helps eliminate road noise. Moreover, and also as best seen in FIG. 4, the opposed side edges of circumferentially adjacent tread block elements are of complementary arcuate contour. That is, the side edges of tread block elements 72 and 78 are of convex contour, while the opposing edges of elements 70 and 80 are of concave contour. Such arcuate edge contour may contribute to improved traction and reduced road noise.

Axial grooves 90 separate rectangular tread block elements 84 at the tire shoulders. Blind axial channels 92 extend from within each block 84 to the associated tread shoulders. It will be noted in FIG. 4 that each groove 90 is positioned circumferentially between adjacent grooves 90 on the opposing side of center plane 60, thereby effectively staggering rectangular tread blocks 84 on opposite sides of the tires. Grooves 90 thus not only provide enhanced channeling of water between adjacent blocks 84, but also cooperate with channels 92 in blocks 84 for improved traction in mud and snow.

The tread pattern per se illustrated in FIGS. 1 and 4 is the subject of application Ser. Nos. 840,812 and 844,966, both filed Mar. 18, 1986 and assigned to the assignee hereof. The disclosures of such applications are incorporated herein by reference.

In accordance with yet another feature of the invention best illustrated in FIG. 4, separation between triangular tread block elements 70,72 in middle series 64 is less than that between adjacent elements 78,80 in series 62,66. Tread block height (i.e., groove depth) remains substantially constant. Thus, cross section of the axially angulated grooves increases from center plane 60 axially outwardly in both directions, thereby providing additionally enhanced water channeling from the central portion of footprint F toward the tread shoulders. Groove depth (tread block height) remains constant between and including outer circumferential grooves 52,58—e.g., 0.310 inches in the exemplary tire size of this disclosure. In wider tires, it may be necessary to provide additional circumferential grooves (in pairs equidistant from the center plane) and corresponding additional series of substantially triangular tread block elements. However, decreasing circumferential-to-axial dimension ratio would be maintained, as would total void volume, preferably 40%.

In order to provide the tread with additional biting edges, all traction elements 70,72,78,80,84 have a notch 94 located at a circumferential edge of the traction element which helps define one of the circumferential grooves 52-58. Triangular traction elements 70,72,78,80 each have a blade 96 therein which communicates with the corresponding notch 94. The blades 96 each have a width so small that they close in passing through the ground-control area (footprint F) of the tire. These blades each extend in an axial direction. Most preferably, the traction elements 70,72 that intersect the mid-circumferential plane 60 have an axial width 74 that is slightly less than the axial distance between the axially innermost circumferential grooves 54, 56 on each side of the mid-circumferential plane by a distance 98 to facilitate better water evacuation from the centermost portion of the tread. In order to increase element stability, the sharp points or corners of the traction elements are beveled as at 89.

Figure 2:
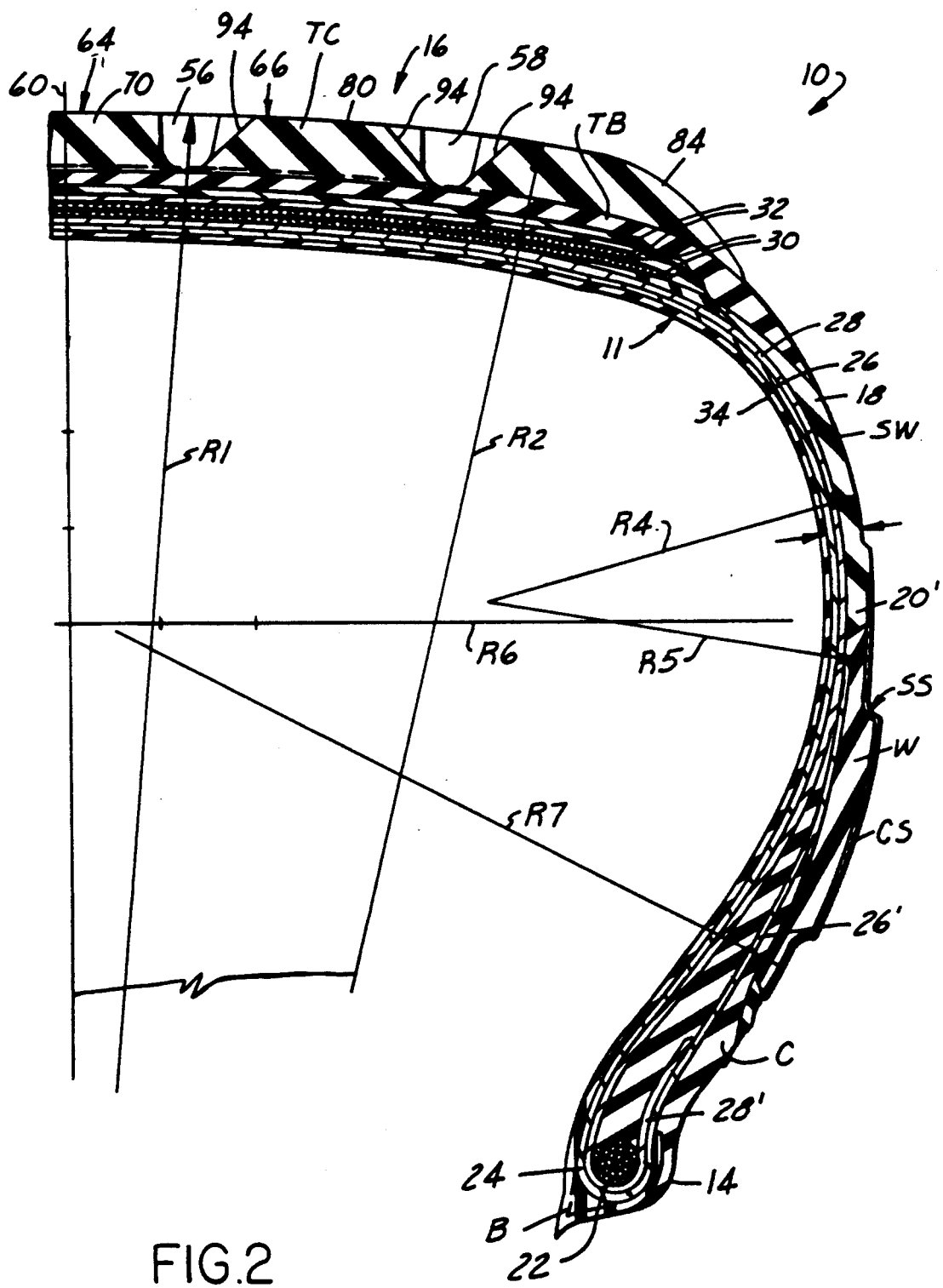
FIG. 2 is a fragmentary half-sectional view of the tire of FIG. 1 shown inflated to normal pressure and unloaded, taken substantially along the line 2—2 in FIG. 1 and drawn to scale, the half-section not shown being essentially a mirror image of that shown (except for decorative ornamentation and normal tire data)
Figure 3:
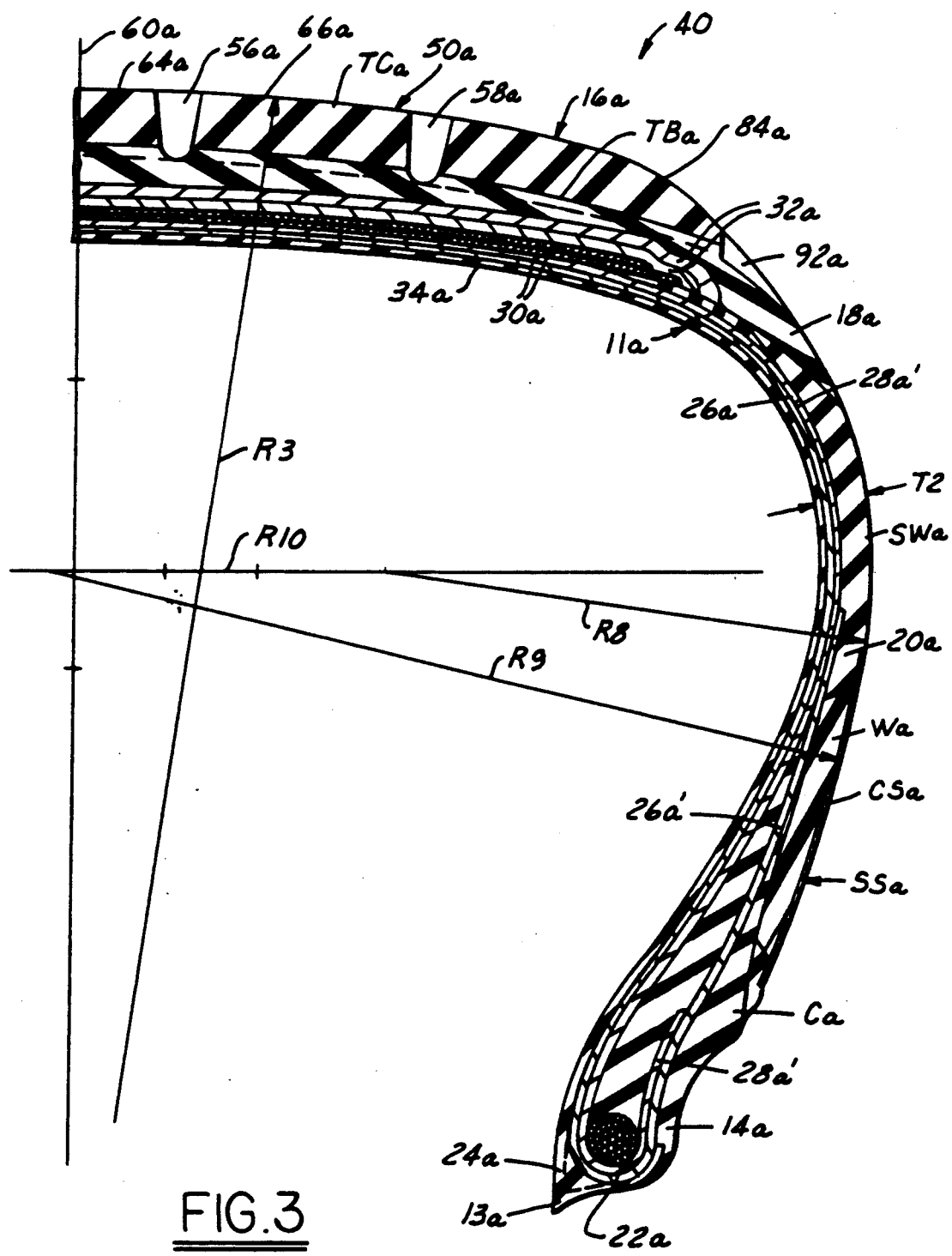
FIG. 3 is a fragmentary sectional view similar to that of FIG. 2 but illustrating a prior art tire construction likewise drawn to scale, the half-section not shown being essentially a mirror image of that shown.

As best illustrated by comparison of tire 10 in FIG. 2 with prior art tire 40 in FIG. 3, the tire tread area 16 in tire 10 of the invention, as molded, has a first radius of curvature R1 between outer circumferential grooves 52, 58 and a second radius of curvature R2 from about the inboard edge of groove 58 (and groove 52) to the adjacent edge of the tread at block 84. Such multiple-radius mold construction is distinguished from the conventional single-radius construction 40 of FIG. 3 in that the multiple-radius design yields more uniform footprint load distribution from center plane 60 to the tread shoulder. The sidewall gauge is reduced as compared with the prior art structure of FIG. 3 for similar performance characteristics, reducing tendency for heat build-up in the shoulder and sidewall, and facilitating use of white sidewall decoration in a high performance speed-rated tire. Indeed, and as best seen in FIG. 2, elastomeric material SW in the tire sidewalls applied to tire carcass 11 after calendering has a thickness in at least one portion of the sidewall less than or equal to the thickness of the carcass and liner at such portion.

Both tires 10, 40 are equilibrium molded. With respect to center plane 60 and the axis of tire 10, radius R1 is centered on plane 60 and radius R2 is centered on a plane parallel to but offset from the center plane. By way of comparison, radius R3 of tire 40 (FIG. 3) is centered on plane 60a. In the tire 10 of size previously noted, radius R1 is 18.499", and radius R2 is about 6.610" centered on a plane offset 1.315" from the center plane, while radius R3 (FIG. 3) for the same size tire is 12.810". (The radii in FIGS. 2 and 3 are those of the molds used to manufacture the respective tires, which radii are intended to be used in the determination of tread radii significant in the appended claims.) Tread width of footprint F (FIG. 4) is 6.34", as compared with a tread width of 5.954" in the tire of FIGS. 3 and 5. Shoulder radii R4 and R5 in FIG. 2, centered at a point offset from the radius R6 of maximum tire width, are 2.393" and 3.1361", while the radius R7 of sidewall 20 is 3.861" centered at radius R6. By contrast, shoulder 18a of prior art tire 40 (FIG. 3) has a uniform radius R8 equal to 2.279", while radius R9 of sidewall 20a is 7.977 inches, both centered at radius R10 of maximum tire width. More importantly, sidewall gauge T1 in tire 10 is 0.100 inches, as compared with gauge T2 in tire 40 of 0.165 inches, corresponding to a thickness reduction of about 40%.

Table 2 lists tire size specifications for an exemplary embodiment of the invention, and Tables 3-6 list corresponding carcass cord, belt, chafer and bead wire data respectively. Tables 7 and 8 list physical and chemical properties of the tire compounds. Table 9 lists tread volume and thickness data.

TABLE 2

| Size of Tire | P205/70HR14 |
|---|---|
| No. of Plies/Load Range | 2 + 2 + 2/B |
| Weight | 22.75 lbs. |
| Rim & Inflation | 14.0 × 5.5 26 PSI |
| Section Width (Inflated), In. | 7.99 |
| Overall Diameter (Inflated), In. | 25.35 |
| Outside Perimeter-Heel to Heel, In. | 17.95 |
| Inside Perimeter-Toe to Toe, In | 17.24 |
| Toe to Heel, In | 0.61 |
| Tread Radius (Inflated), In | 15.50/10.00 |
| Tread Arc Width (Inflated), In | 6.34 |
| Non-Skid Depth, In | 0.31 |
| Tread Thickness, In | 0.410 |
| Total Crown Thickness, In | 0.669 |
| Total Shoulder Thickness, In | 0.676 |
| Shoulder Tread Rubber Thickness, In | 0.385 |
| Air Volume, Cu. In | 1988 |
| Material Volume, Cu. In | 521 |
| Inside Bead Circ., In.-Heel | 43.70 |
| Inside Bead Diam., In.-Heel | 14.16 |
| Size Factor (32.76 In.-Min.), In | 33.53 |
| Sidewall gauge (black) In | 0.17 |
| Sidewall gauge (white) In | 0.20 |
| Tread Net/Gross (area) | 0.60 |
| Section Height (Infl.) In | 5.68 |

TABLE 3

| CARCASS CORD DATA (Polyester) | Plies 26, 28 (Avg.) |
|---|---|
| Cord Construction | (1000)/2 |
| Cord Tensile-Conditioned, Lb | 29.6 |
| Cord Tensile-Bone Dry, Lb | 31.2 |
| LASE at 5% Conditioned, Lb | 7.2 |
| LASE at 5% Bone Dry, Lb | 7.2 |
| Elong. at Break-Conditioned,% | 21.9 |
| Elong. at Break-Bone Dry,% | 22.6 |
| Cable Twist, Turns per Inch | 12.5 |
| Direction of Twist | z/s |
| Cord Gauge, In | 0.022 |
| Cords/Inch Crown Normal | 16.1 |
| Cords/Inch Crown Circum | 16.0 |
| Cord Angle-Crown, Deg | 85 |
| Picks per Inch | 1.4 |
| Ply Gauge at Crown: | |

TABLE 3-continued

| CARCASS CORD DATA (Polyester) | Plies 26, 28 (Avg.) |
|---|---|
| Bottom of Ply 1 to Top of Ply 2 | 0.023 In. |
| Total Carcass Strength/Inch-Normal | 1005 Lb.: Cond. 953 Lb. |
| Total Carcass Strength/Inch-Circum | 998 Lb.: Cond. 947 Lb. |
| Including Belts | |
| | 7891 Lb.: Cond. 7888 Lb. |
| | 2846 Lb.: Cond. 2795 Lb. |

TABLE 4

| BELT OVERLAY DATA | Belts | | Overlays | |
|---|---|---|---|---|
| | 1 | 2 | 3 | 4 |
| Material | Wire | Wire | Nylon | Nylon |
| Cord Construction | 2 × 0.30 mm | | (840)/2 | (840)/2 |
| Tensile, Lb | 99 | — | — | |
| O.D. (without wrap) | 0.61 mm | — | — | |
| Cable Construction | 2 × .30 mm* | — | — | |
| Lay | 0.67 Left | — | — | |
| Total Wires | 2 | — | — | |
| Cord Tensile-Cond., Lb. | — | — | 32.3 | — |
| Cord Tensile- | — | — | 31.6 | — |
| Bone Dry, Lb. | | | | |
| Cable Twist, Turns per Inch | — | — | 12.0 | 12.0 |
| Direction of Twist | — | — | z/s | z/s |
| Cord Gauge, In | — | — | 0.022 | 0.022 |
| Picks per Inc | 0.0 | 0.0 | 1.2 | 1.2 |
| Cords/Inch-Crown-Normal | 21.75 | 21.4 | 35.5 | 35.5 |
| Cords/Inch-Crown-Circum | 10.14 | 8.0 | 0.0 | 0.0 |
| Cord Angle-Crown, Deg | 25.0 | 22.0 | 0.0 | 0.0 |
| Belt Lay | Right | Left | Circumf. | Circumf. |
| Belt Width, In | 6.53 | 6.20 | 7.18 | 7.26 |

TABLE 5

| CHAFER | | |
|---|---|---|
| Material | Nylon Mono-Multi Fil. Woven | Rubber |
| Cords/Inch (Count) | 26 × 2 | — |
| Width, In | 2.00 | 2.20 |

TABLE 6

BEAD  5 turns 5 strands of 0.037 in. diameter wire. Semi-hard rubber insulation and filler stock. No fabric cover. Tensile - 314 Lb.

TABLE 7

| PHYSICAL PROPERTIES | TREAD | BLACK SIDE-WALL | WHITE SIDE-WALL | LINER LINER |
|---|---|---|---|---|
| Hardness (Shore A). | 71 | 59 | 60 | 62 |
| Stress at 100% Elong., PSI | 380 | 210 | 190 | 100 |
| Stress at 200% Elong., PSI | 1200 | 590 | 430 | 190 |
| Stress at 300% Elong., PSI | 2200 | 1110 | 650 | 350 |
| Stress at 400% Elong., PSI | — | 1700 | 840 | 480 |
| Stress at 500% Elong., PSI | — | — | 1050 | 690 |
| Stress at Break, PSI | 2670 | 2110 | 1300 | 1280 |
| Elongation at Break, % | 350 | 470 | 600 | 730 |

| | SHOULDER BASE OF TREAD | RUBBER CHAFER | BEAD FILLER |
|---|---|---|---|
| Hardness.(Shore A) | 71 | 86 | 89 |

TABLE 8

| CHEMICAL ANALYSIS | TREAD | BLACK SIDEWALL | WHITE SIDEWALL | LINER | BELT CMPD. | BEAD FILLER |
|---|---|---|---|---|---|---|
| Specific Gravity | 1.188 | 1.100 | 1.399 | 1.112 | 1.166 | 1.211 |
| Plasticizer, % | 12.72 | 9.14 | 4.75 | 7.12 | 6.02 | 7.26 |
| Ash, % | 3.82 | 2.73 | 45.02 | 3.90 | 7.45 | 6.46 |
| Insol in HCl, | 1.40 | 0.33 | — | 2.11 | 2.62 | 0.98 |
| Carbon Black, % | 36.89 | 28.26 | — | 30.31 | 31.84 | 39.20 |
| Total Sulfur, % | 1.66 | 1.26 | 1.00 | 1.00 | 2.04 | 2.08 |
| Zinc Oxide, % | 1.56 | 1.93 | 1.75 | 0.35 | 3.56 | 2.08 |
| Calcium Carbonate, % | 0.00 | 0.00 | 0.00 | 0.00 | 0.00 | 0.00 |
| $TiO_2$, % | — | — | 21.29 | — | — | — |
| $SiO_2$, % | — | — | 11.16 | — | 1.73 | — |
| Rubber Polymer by Weight, % | 42.13 | 60.03 | 50.08 | 56.6 | 54.98 | 48.23 |
| Insol in $H_2SO_4$, % | — | — | 17.12 | — | — | — |
| Magnesium Oxide, % | — | — | — | 0.04 | — | — |
| Cobalt, % | — | — | — | — | 0.06 | — |

| | SUBTREAD | RUBBER CHAFER |
|---|---|---|
| Specific Gravity | 1.143 | 1.194 |

TABLE 9

TREAD DATA - VOLUME AND THICKNESS

| VOL. CU. IN. | | | Thick. | N.S. Thick. | Under Ratio | |
|---|---|---|---|---|---|---|
| Total Tread | Non-Skid | Under Skid | % Under To N.S. | At Cr. (In.) | At Cr. (In.) | N.S. to Under Skid |
| 153.8 | 104.8 | 49.0 | 46.76 | 0.310 | 0.089 | 78:22 |

For other tire sizes, at least in 13, 14 and 15 inch diameters and 60, 65 and 70 (per cent) aspect ratios, tread radii increase generally with section width and aspect ratio. Non-skid depth, total shoulder gage, tread shoulder gage and tread width all vary generally as scaled functions of tire size. Sidewall gage remains substantially constant.

As was earlier mentioned, the average groove (non-skid) depth in the tread portion 16 of the tire 10 is reduced 11% from that of the prior art tire 40. Average groove depth varies, however, from tire size to tire size and, according to the preferred tire of the invention, will be as shown in Table 10. The Table 10 average groove depths are "highway" groove depths defined by the Tire and Rim Association, Inc., for the specified tire sizes, depend both on section width and aspect ratio and are reduced more than 11% from the "traction" groove depths specified by the Tire and Rim Association. Groove depth preferably is constant in the laterally extending groove portions located between circumferential grooves 52 and 58; laterally extending groove portions axially outward of circumferential grooves 52 and 58 preferably are reduced from the axially inward constant depth of 7.9 mm (Table 10) to about 7.0 mm.

TABLE 10

| Section Width | Average Groove Depth (mm) | |
|---|---|---|
| | 70% (& Above) Aspect Ratio | 65% (& Below) Aspect Ratio |
| P125 | 7.1 ± 0.4 | 6.9 ± 0.4 |
| P135 | 7.2 ± 0.4 | 7.0 ± 0.4 |
| P145 | 7.3 ± 0.4 | 7.1 ± 0.4 |
| P155 | 7.4 ± 0.4 | 7.2 ± 0.4 |
| P165 | 7.5 ± 0.4 | 7.3 ± 0.4 |
| P175 | 7.6 ± 0.4 | 7.4 ± 0.4 |
| P185 | 7.7 ± 0.4 | 7.5 ± 0.4 |
| P195 | 7.8 ± 0.4 | 7.6 ± 0.4 |
| P205 | 7.9 ± 0.4 | 7.7 ± 0.4 |
| P215 | 8.0 ± 0.4 | 7.8 ± 0.4 |
| P225 | 8.1 ± 0.4 | 7.9 ± 0.4 |
| P235 | 8.2 ± 0.4 | 8.0 ± 0.4 |
| P245 | 8.3 ± 0.4 | 8.1 ± 0.4 |
| P255 | 8.4 ± 0.4 | 8.2 ± 0.4 |
| P265 | | 8.3 ± 0.4 |
| P275 | | 8.4 ± 0.4 |
| P285 | | 8.5 ± 0.4 |
| P295 | | 8.6 ± 0.4 |
| P305 | | 8.7 ± 0.4 |

Figure 5:
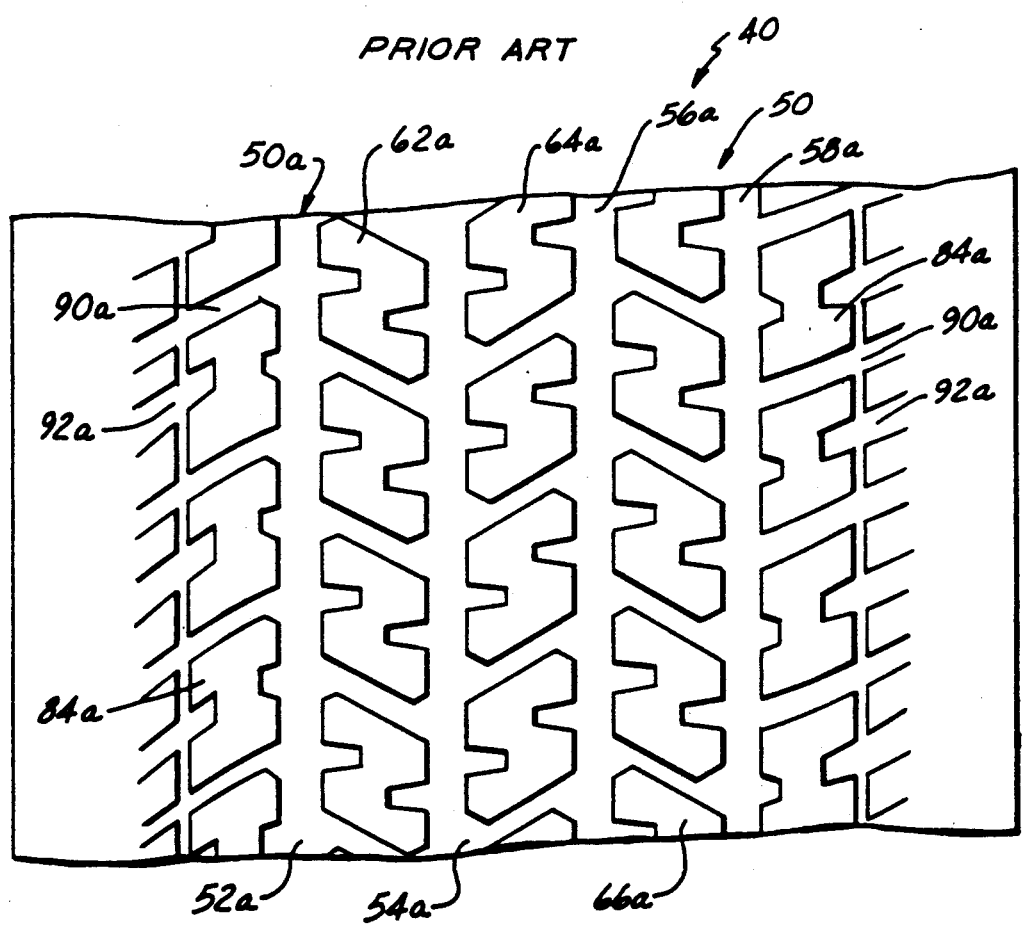
FIG. 5 is a fragmentary view similar to that of FIG. 4 but illustrating tire tread pattern of the prior art tire construction of FIG. 3.

It has been found that tires constructed in accordance with the present invention, at least in 13, 14 and 15 inch diameters and 60, 65 and 70 percent aspect ratios, present at least a 15% improvement in snow traction as compared with the prior art tire of FIGS. 3 and 5, a 5% improvement in wet pavement traction and handling, and up to 10% noise reduction, without substantially affecting rolling resistance, dry pavement handling or treadwear rate. Furthermore, such tires are actually lighter than the comparable prior art high performance tire. Specifically, in a tire constructed in accordance with the present invention of size P205/70HR14 hereinabove discussed, a 12% reduction in tire weight has been experienced as compared with the prior art tire of FIGS. 3 and 5 for identical size and speed rating. Weight reductions for other tire sizes are comparable. Thus, the invention provides a high performance tire suitable for all season use. The tire of specific size herein disclosed exhibits a reduced tire weight to internal volume ratio of substantially 0.011 lbs./in.$^3$.

The invention claimed is:

1. An all-season high-performance radial-ply pneumatic tire for passenger and light truck vehicles, the tire comprising:
   (a) a tire carcass including a pair of axially spaced annular beads, annular tensile members within the beads, a pair of plies having cords extending radially of the tire between the annular tensile members, reinforcing belt structure circumferentially surrounding and reinforcing the carcass, liner means positioned on the inner side of the carcass for retaining pressurized air within the tire when it is mounted on a rim and inflated, and a tire tread positioned radially outwardly of the belt structure, the tread having a ground-engageable surface and two axially opposite lateral edges, the lateral edges of the tread being defined by the lateral width of the tread surface that contacts the ground when the tire is mounted on its design rim and is at normal-inflation pressure and normal load,
   (b) the tire tread being made of elastomeric material and having grooves of depth at its lateral edges equal to the full groove depth at the mid-circumferential plane of the tire, such grooves at the lateral edges being angled in the axial direction for a distance of at least one-half inch at the tread surface and having a width at such surface of at least 0.060 inch;
   (c) the tire having a nominal section width of 205 mm, a nominal aspect ratio of 70 and being constructed for mounting on a 14 inch design rim;
   (d) said tire weighing substantially 22.75 lbs., having a tread arc width (inflated) of substantially 6.34 inches, a non-skid depth of substantially 0.31 inches, a tread thickness of substantially 0.410 inches, a total crown thickness of substantially 0.669 inches, a total shoulder thickness of substantially 0.676 inches, a shoulder tread rubber thickness of substantially 0.385 inches, and a tread void volume of substantially 40%.

2. The tire set forth in claim 1 having a tread hardness of substantially 71, a sidewall hardness in the range of about 59–60, a liner hardness of 62, and a shoulder hardness at base of tread of substantially 71, all measured on the Shore A scale.

3. The tire set forth in claim 2 wherein the tire tread has a total volume of about 153.8 in.$^3$, a non-skid volume of about 104.8 in.$^3$ and an under-skid volume of about 49.0 in.$^3$.

* * * * *